Jan. 9, 1962
E. M. BAILEY
3,016,464
APPARATUS FOR DETERMINING THE LOCATION AND
THICKNESS OF A REFLECTING OBJECT
Filed June 10, 1959
5 Sheets-Sheet 3
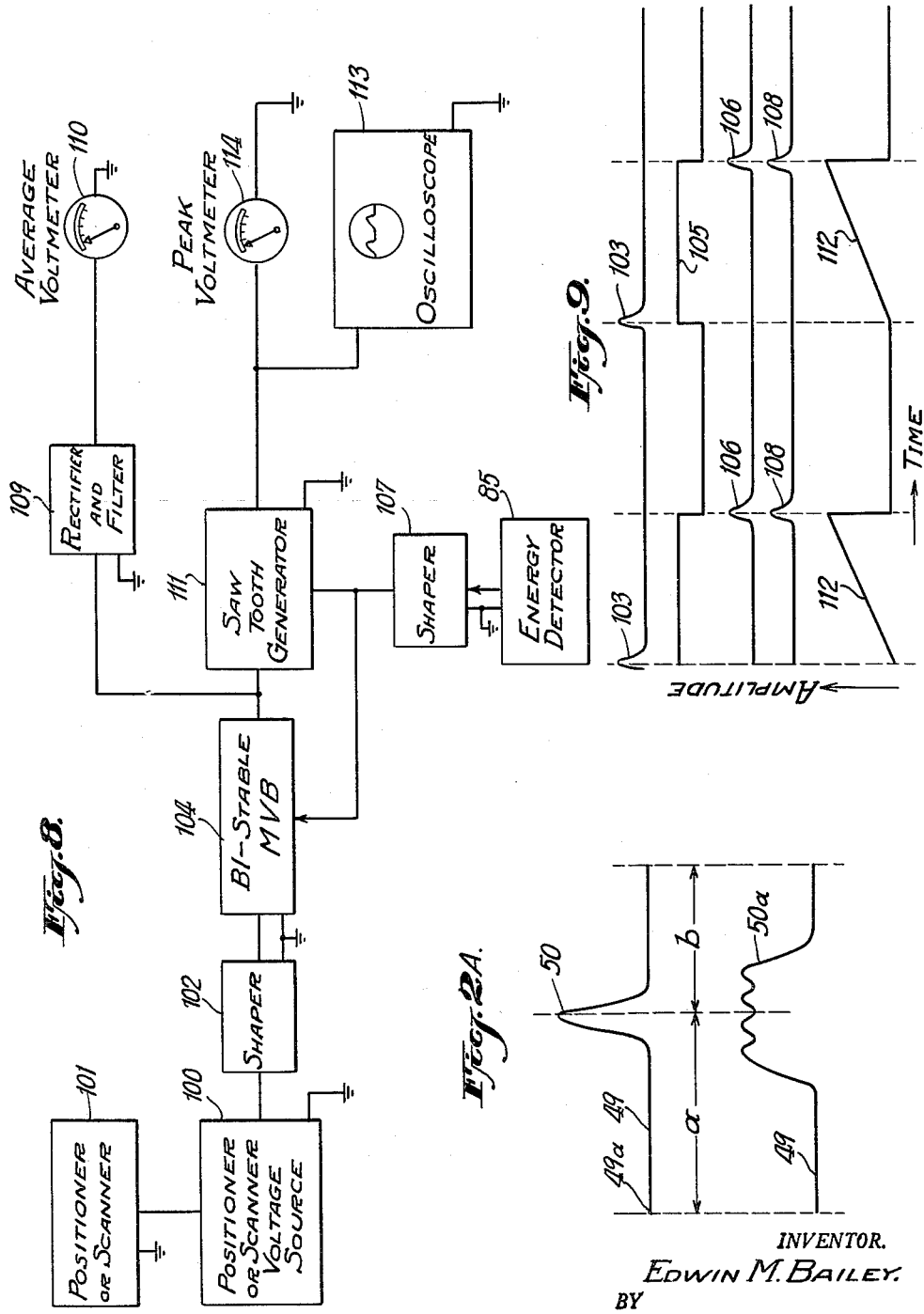
INVENTOR.
EDWIN M. BAILEY.
BY
*Ward, Neal, Haselton, Orme & McElhannon*
ATTORNEYS.

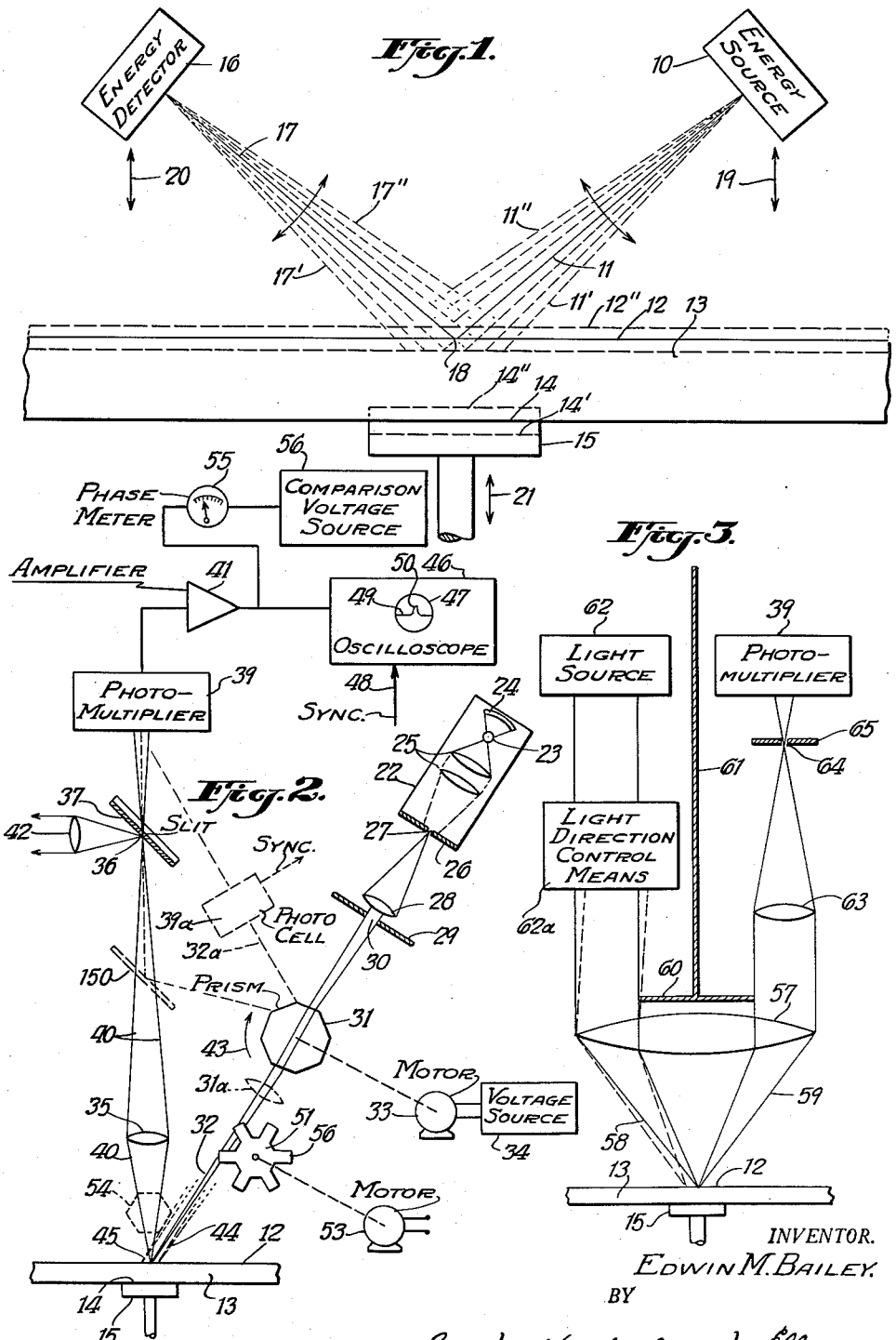

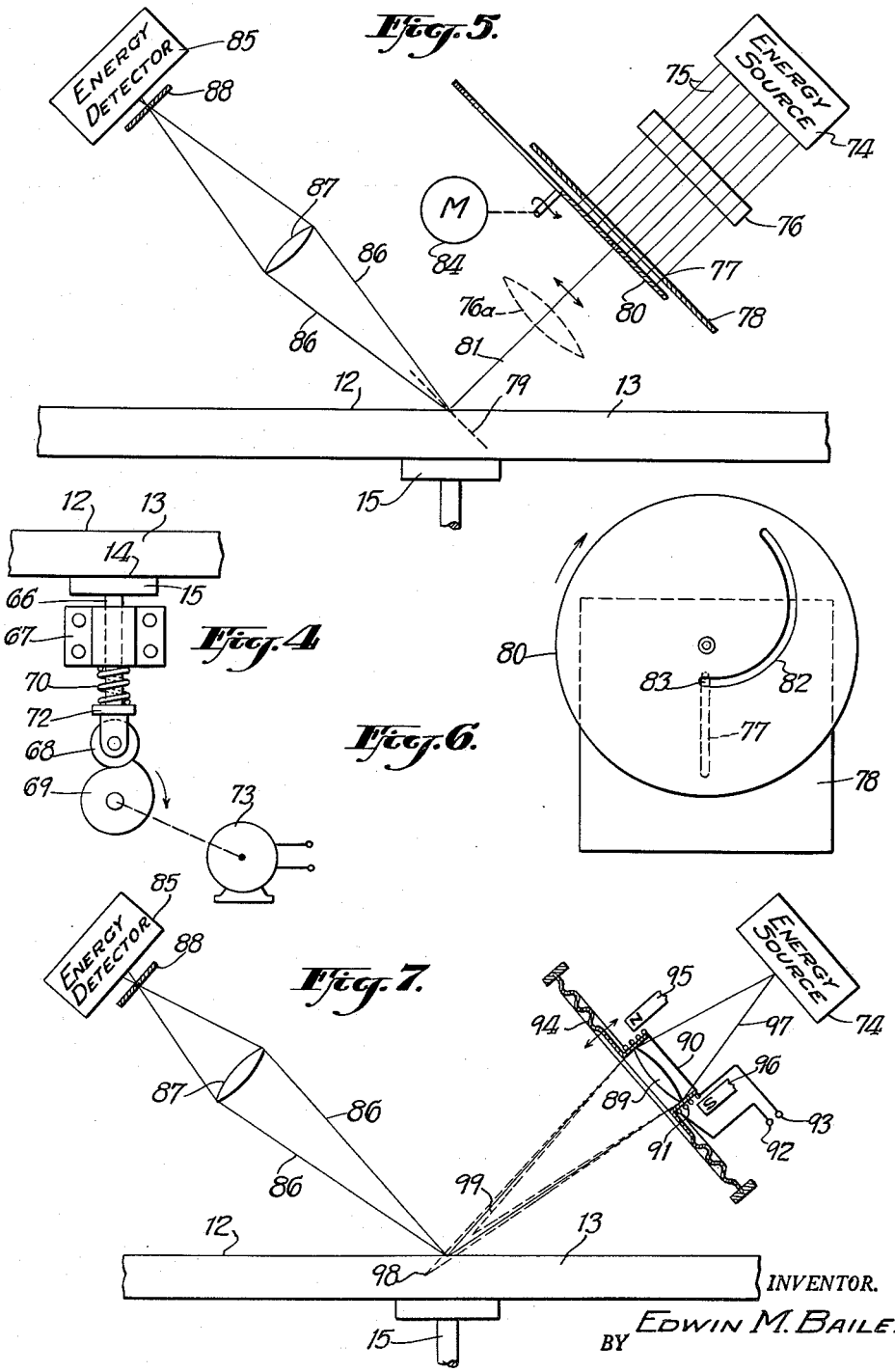

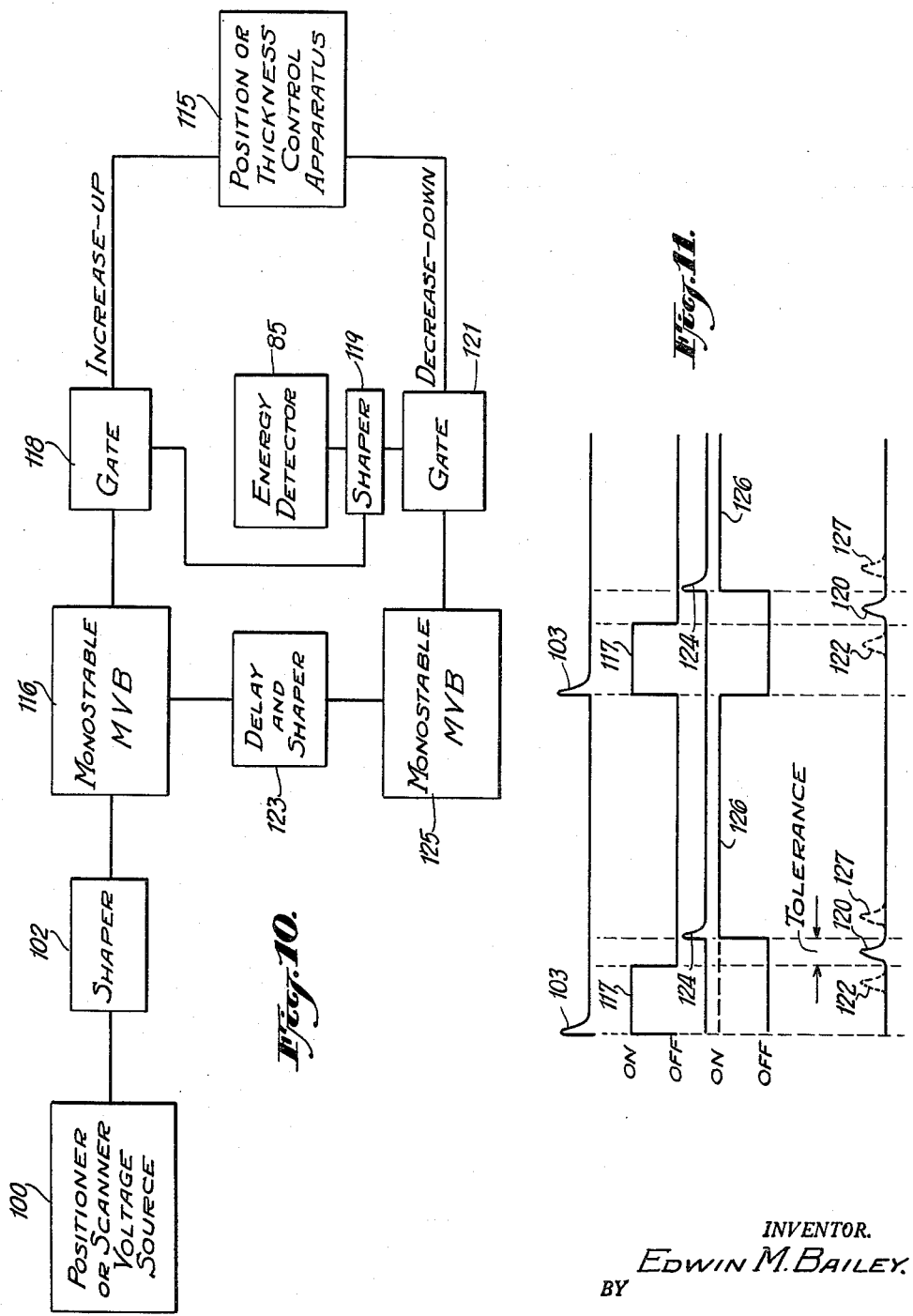

Jan. 9, 1962
E. M. BAILEY
3,016,464
APPARATUS FOR DETERMINING THE LOCATION AND
THICKNESS OF A REFLECTING OBJECT
Filed June 10, 1959
5 Sheets-Sheet 5
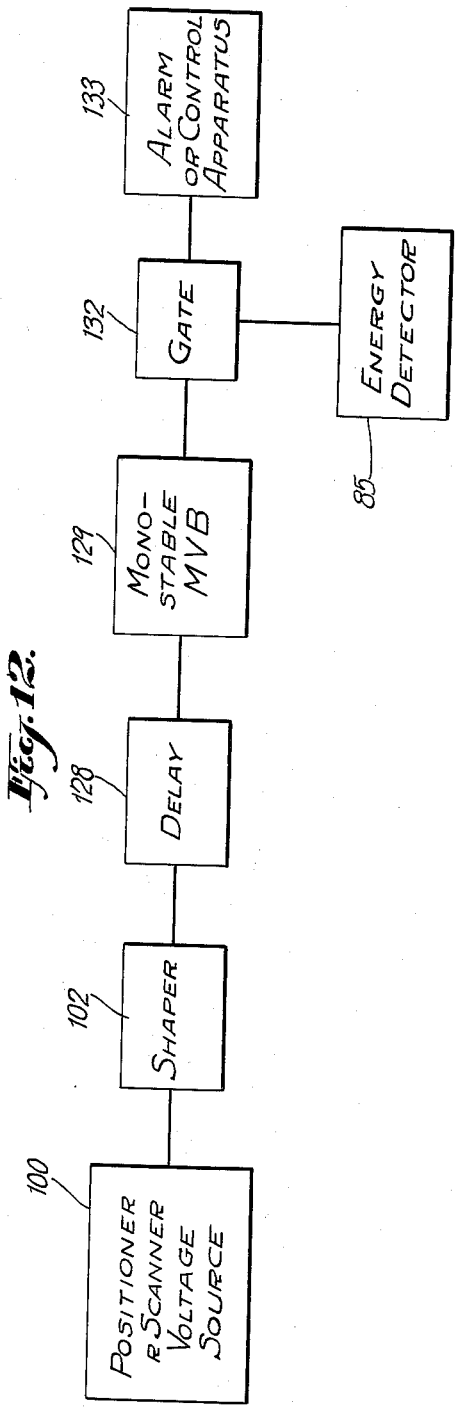
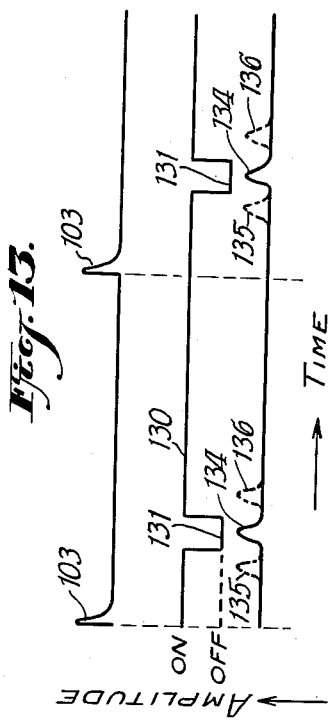
INVENTOR.
EDWIN M. BAILEY.
BY
Ward, Neal, Haselton, Orme & McElhannon
ATTORNEYS.

United States Patent Office 3,016,464
Patented Jan. 9, 1962

3,016,464
APPARATUS FOR DETERMINING THE LOCATION AND THICKNESS OF A REFLECTING OBJECT
Edwin M. Bailey, Ridgewood, N.J., assignor to Daystrom Incorporated, Murray Hill, N.J., a corporation of New Jersey
Filed June 10, 1959, Ser. No. 819,277
20 Claims. (Cl. 250—219)

This invention relates to apparatus for measuring the distance of a surface of an object from a reference position or positions and more particularly relates to apparatus for measuring the spacing between the surface of a material and a reference position or positions by means of electromagnetic radiant energy such as light, either visible, ultra-violet or infra-red, X-rays, beta rays and similar forms of electromagnetic radiant energy.

Optical devices for measuring the distance of the surface of an object from a reference position or for measuring the contour of an object, are well known. However, such devices are often unsuitable for the rapid determination of such distance, often cannot be used readily for operating automatic position or thickness control apparatus, cannot be used to determine rapidly distance, position, or thickness over a wide range of values concurrently with high accuracy and usually require that certain determinations be made by a relatively skilled operator. Furthermore, certain of such prior art devices are sensitive to the reflection and color characteristics of the surface of the object, and thus, cannot be used if the object is moving and the reflection and color characteristics of the surface of the object are not uniform.

Also well known are optical devices depending upon reduction of radiation transmitted through the object to measure thickness. However, such devices do not measure position of the object and may have their accuracy impaired by variations of optical absorption coefficient of the material of which the object is composed. These variations of absorption coefficient may vary with time, with position within the body of the object or may vary from object to object.

In the apparatus of the present invention, a narrow illuminating beam of electromagnetic radiant energy, the path along which the maximum amount of energy is directed being hereinafter termed the illuminating direction, is directed toward the surface of the object, and a directive detector responsive to said energy and having a narrow directional receiving pattern, hereinafter called the viewing beam, is mounted so as to receive energy reflected by said surface. In the preferred embodiment of the invention, the illuminating beam is swept across the surface along a path which intersects the path along which the maximum energy is received by the detector said last-mentioned path being hereinafter termed the viewing direction. However, the viewing beam may be moved instead of sweeping the illuminating beam or said beams may be moved in synchronism. Alternatively, said beams may remain fixed and the object itself may be moved in a predetermined direction from a predetermined reference position. In each case the position of the illuminating beam, viewing beam or object at which maximum energy is received by the detector is a measure of the distance of the reflecting surface from a reference position. By changing the position of the illuminating beam, viewing beam or object rapidly, the measurement may be made independent of the color, reflectivity or other characteristics of the surface even though the apparatus is employed to measure moving sheets or films or other moving objects.

In a modified embodiment of the invention, the illuminating beam may be focused by a conventional lens system, and by varying the focal point with respect to the surface of the object, the viewing beam, and the illuminating beam may remain fixed and the object may be stationary or may be moved transversely to the direction of measurement. In this embodiment, the position of the lens system when maximum energy is received by the detector is a measure of the distance of the reflecting surface from a reference position.

In each of the embodiments, the movement of said viewing beam, said illuminating beam or its focal point or said object is related to a reference position, and the position of maximum energy reception is indicated by means which is operated in a predetermined relation to the movement of the moving means and which is operated by the detector output signal. As described hereinafter, the detector output signal may be used also to operate known types of automatic controls to control the position or thickness of the object or to perform other functions.

It is one object of the invention to provide apparatus which permits rapid and accurate determination of the distance of a reflecting surface of an object from a reference position.

It is a further object of the invention to provide apparatus which may be employed for measuring the thickness of materials even though the surface of such materials may be non-uniform in color or in reflection characteristics.

It is a further object of the invention to provide apparatus which may be employed to control automatically the thickness or selection of materials.

It is a further object of the invention to provide apparatus which may be employed for measuring contour and roughness of materials.

Other objects of the invention will be apparent from the following detailed description of the manner in which I now prefer to practice the invention, which description should be considered in connection with the accompanying drawings in which:

FIG. 1 is a schematic diagram employed to illustrate the principle of the invention;

FIG. 2 is a combined schematic and block diagram which illustrates the preferred embodiment of the invention;

FIG. 2A is a graph of electrical wave forms obtained with the apparatus shown in FIG. 2;

FIG. 3 is a combined schematic and block diagram which illustrates a modified form of the embodiment illustrated in FIG. 2;

FIG. 4 is an elevation view of one form of material positioning device which may be employed in one embodiment of the invention;

FIG. 5 is a combined schematic and block diagram which illustrates a further embodiment of the invention;

FIG. 6 is a plan view of a portion of the apparatus employed in the embodiment illustrated in FIG. 5;

FIG. 7 is a combined schematic and block diagram which illustrates a further embodiment of the invention;

FIG. 8 is a block diagram of electrical measuring apparatus which may be employed with any of the preceding embodiments of the invention;

FIG. 9 illustrates voltage wave forms which are generated in certain of the electrical apparatus illustrated in FIG. 8;

FIG. 10 is a block diagram of electrical apparatus which may be employed with any of the embodiments illustrated in the preceding figures to control automatically the thickness of materials being measured;

FIG. 11 shows voltage wave forms generated in certain of the electrical apparatus illustrated in FIG. 10;

FIG. 12 is a block diagram of automatic alarm or control apparatus which may be employed with any of the embodiments of the invention illustrated in FIGS. 1–7; and FIG. 13 illustrates voltage wave forms generated in certain of the electrical apparatus illustrated in FIG. 12.

The block identified by the reference numeral 10 in FIG. 1 represents an electromagnetic radiant energy source such as a source of light, either visible, ultraviolet or infra-red, a source of X-rays, a source of beta rays, or a source of other similar forms of electromagnetic radiant energy. For purposes of explanation it will be assumed hereinafter that the energy source 10 is a visible light source but it will be apparent to those skilled in the art, from the description hereinafter given, that the apparatus of the invention may employ the other forms of electromagnetic energy mentioned above.

The light from the source 10 is concentrated in a narrow illuminating beam represented diagrammatically by the solid line 11 in FIG. 1 and by the use of a conventional lens system, the light may be focused substantially at the upper surface 12 of the material or object 13, which rests on the upper surface 14 of a positioning device 15. However, since the object is to obtain a relatively narrow beam of radiant energy at the upper surface 12, other known methods and devices for producing such narrow beam may be employed.

The block identified by the reference numeral 16 in FIG. 1 represents a detector for the energy of the source 10 reflected by the surface 12, and when light energy is employed, the energy detector 16 may, for example, be a photocell with associated amplifier circuits. By selection of the detector and optical means, which may include a mask with a slit, and their relative sizes and positions, in a manner well known to those skilled in the art, the path along which light is received and detected by the detector 16 may be a relatively narrow path represented diagrammatically by the solid line path 17 which corresponds to the viewing beam. Light from the image formed at 18 on the upper surface 12 by the energy source 10 falls on the photocell of the energy detector 16.

If the viewing beam 17 and the positioning device or positioner 15 are maintained in fixed positions and if the illuminating beam 11 is moved from the position shown in dotted lines 11′ to the position shown in dotted lines 11″, it has been found that the maximum amount of energy is received by the detector 16 when the beam 11 is in the position indicated by the solid line, at which position both the viewing direction of the beam 17 and the illuminating direction of the illuminating beam 11 intersect at the surface 12. However, if the upper surface of the material or object 13 is in the position indicated by the dotted line 12′, the maximum amount of energy will be received by the detector 16 when the beam of energy from the source 10 is in a position intermediate the positions indicated by the dotted line 11′ and the solid line 11. Also, when the upper surface of the material or object 13 is in the position indicated by the dotted line 12″, the maximum amount of energy will be received by the detector 16 when the beam of energy from the source 10 is in a position intermediate the position indicated by the solid line 11 and the position indicated by the dotted line 11″. Accordingly, the position of the surface 12 is indicated by the position of the beam 11 at the time that maximum energy is received by the detector 16.

Similarly, if the beam 11 and the positioner 15 are maintained in fixed positions and the viewing beam 17 is moved from the position indicated by the dotted line 17′ to the position indicated by the dotted line 17″, the height of the surface 12 above the surface 14 of the positioner 15 is indicated by the position of the viewing beam 17 at which maximum energy is received by the detector 16. In addition, if the positioner 15 is maintained in a fixed position and if the illuminating beam 11 and the viewing beam 17 are moved in synchronism, the position of the surface 12 and hence, its height above the surface 14, is indicated by the positions of the beam 11 and the beam 17 at the time that maximum energy is received by the detector 16.

In a similar manner, the beam 11 and the beam 17 may be maintained in fixed positions and the positioner 15 may be moved so that the upper surface thereof moves from the position indicated by the dotted line 14′ to the position indicated by the dotted line 14″ and the position of the positioner 15 at which maximum energy is received by the detector 16 is an indication of the height of the surface 12 above the surface 14 of the positioner 15.

It will be noted from the foregoing that if the beam 11 and the beam 17 are maintained in fixed angular positions and at an angle to each other, such as the positions indicated by the solid lines 11 and 17, and if the positioner 15 is maintained in a fixed position, the relative positions of the source 10 and the detector 16 with respect to the surface 12 may be indicated by moving the source 10 and the detector 16 in a predetermined manner along paths, such as the paths indicated by the arrows 19 and 20, extending substantially perpendicular to the surface 12. For example, if the source 10 and the detector 16 are moved toward the surface 12 from positions which are spaced from the surface 12 distances greater than those shown in FIG. 1, the maximum amount of energy will be received by the detector 16 when the viewing direction of the beam 17 and the beam 11 intersect at the surface 12 and hence when the source 10 and the detector 16 are approximately in the positions indicated in FIG. 1. Since the positions of the source 10 and the detector 16 at which the maximum amount of energy is received by the detector 16 may be predetermined, the receipt of the maximum amount of energy by the detector 16 is the source 10 and the detector 16 are moved toward the surface 12 will indicate that the source 10 and the detector 16 have reached said predetermined positions. It will be apparent to those skilled in the art that instead of moving both the source 10 and the detector 16 synchronously, either the source 10 or the detector 16 may be maintained in a fixed position and the other one thereof may be moved along its respective path. In this latter case the receipt of the maximum amount of energy by the detector 16 will also indicate that the source 10 or the detector 16, whichever is moved, has reached the position spaced a predetermined distance from the surface 12.

Similarly, if the beam 11 or the beam 17 or both are moved angularly, either periodically or otherwise, at a relatively high rate with respect to the rate at which the source 10 or the detector 16 or both are moved toward the surface 12 or if the positioner 15 is moved relatively rapidly, either periodically or intermittently along the path indicated by the arrow 21 in FIG. 1 as either the source 10 or the detector 16, or both, is moved toward the surface 12, the position of the source 10 or the detector 16, whichever is moved, with respect to the surface 12, will be indicated, within a predetermined range, by the position of the beam 11, the beam 17 or the positioner 15 at which maximum energy is received by the detector 16. In case either source 10 or detector 16 is moved alone, the direction of motion should not be solely along the illuminating direction if source 10 alone be moved or solely along the viewing direction if detector 16 alone be moved.

It will be noted in all cases that the point of intersection of the illuminating direction and the viewing direction moves, during each scan, along a locus hereinafter called the intersection locus. The position of the reflecting surface 12 at which said surface intersects the intersection locus is indicated by the response of detector 16 which results when the scan reaches that point, and the apparatus of the subject invention may be calibrated in terms of distances or displacements along the intersection locus or in terms of related variables. In the special case of a moving positioner 15 and stationary illuminating and viewing beams, this locus is a single point, or alternatively may be regarded as a line locus with respect to the moving positioner 15. The scanning of the beams or movement of the source, detector or positioner may be linear or non-linear and periodic or random, as desired.

It is apparent that even though the magnitude of the energy received by the detector 16 may be affected by the color or reflection characteristics of the surface 12, the position of the beam 11, the beam 17 or the positioner 15 at which the maximum amount of energy is received by the detector 16 is substantially unaffected by the color or reflection characteristics of the surface 12. Therefore, the apparatus of the invention may be employed to measure the position of the surface and its height above the surface 14 whether the surface 12 is uniform or non-uniform in color and reflection characteristics.

The apparauts of the invention has many applications and may, for example, be employed for measuring the surface level of different materials such as liquids, plastic films, paper sheets, etc., for measuring and controlling the thickness of materials, for sorting articles of different sizes, for measuring the proximity of objects to each other, such as cranes, vehicles, trains, etc., and for measuring or controlling the amplitude of vibration of an object.

A preferred embodiment of the invention particularly adapted for measuring the thickness of materials is illustrated in FIG. 2. I have found that with the embodiment illustrated in FIG. 2, the thickness of materials may be measured with a precision of 0.0005 inch or better. With the embodiment shown in FIG. 2, it has been found that color or reflectivity have little effect upon the precision with which measurement may be made and the material may be one having poor reflection characteristics, such as black plastic electrical tape. However, it has been found that materials with surfaces having good reflectivity will permit even greater accuracy of measurement.

In FIG. 2, a projector 22, such as a conventional slide projector, serves as a light source and comprises a lamp 23, a reflector 24 and a condensing lens system 25. An opaque mask 26 is mounted rigidly in the projector 22 in the position normally occupied by a slide, and the mask 26 is provided with a narrow slit 27 therethrough. A projection lens 28 is mounted so as to focus an image of the slit 27 substantially on the surface 12 of the object or material 13 and extending substantially perpendicular to the plane of the drawing. To limit the size of the light beam beyond the projection lens 28 to the surface 12, a further mask 29 is mounted adjacent the projection lens as shown and has a rectangular slit 30 therethrough which extends parallel to the slit 27. Although as shown in FIG. 2, the distance between the lens 28 and the slit 27 is shorter than the distance between the lens 28 and the surface 12, it is preferred that the former distance be greater than the latter distance because a smaller image may be produced on the surface 12 for a given size of slit 27.

Although other known forms of light deflecting means may be employed, FIG. 2 shows an octagonal prism 31 which may be made of a light transparent substance such as glass, quartz, plastic, etc. As is well known, light striking one face of the prism 31 will emerge from the opposite face parallel to the incident beam of light, but displaced laterally by an amount which varies periodically and in a known manner when the prism 31 is rotated continuously, and therefore, by rotating the prism 31, the beam 32 may be caused to scan the surface 12 along a predetermined scanning path and in a predetermined manner. The prism 31 may be rotated by a synchronous motor 33 connected to an alternating current voltage source 34. If desired, a prism with non-parallel sides may be substituted for the regular prism 31 shown in FIG. 2.

The sensitivity of the apparatus is affected by the length of the intersection locus, heretofore defined, a shorter locus providing higher sensitivity and a longer locus providing lower sensitivity. On the other hand, the length of the locus must be sufficient to permit measurement of the position of the surface 12 within the expected range of variation. If a prism 31 is employed to deflect the beam 32, the length of the locus may be varied by employing prisms of different size, a smaller prism providing a locus of shorter length. Alternatively, the length of the locus may be varied or controlled by employing a lens, such as the lens 31a, shown in dotted lines in FIG. 2 between the prism 31 and the surface 12. Lens 31a may be converging, diverging, cylindrical, aspherical, etc. The bending of the light beam 32 by lens 31a may be made by proper choice of lens shape in a well known manner to produce a variety of chosen functions of motion with respect to time or rotation of prism 31. In particular, this may be made to compensate the scan to be strictly linear with respect to time, if desired.

Under normal conditions the beam of light 32 which scans the surface 12 may be visible light, but if it is desired to minimze the effects of stray light falling on the surface 12, the light of the beam 32 may be polarized, colored, infra-red or ultra-violet. If a relatively small line or point source of light is used, the projector 22 and the mask 26 may be omitted, the line or point source of light being placed at the position of the slit 27. The projection lens may be a single lens 28 as shown or may be a more complex lens system of any well known type.

A lens or lens system shown schematically at 35 and preferably having the same focal length as that of the projection lens 28 is positioned above the surface 12 as shown in FIG. 2 and is positioned so as to focus an image of the slit image formed on the surface 12 by the lens 28 on a scratch or slit in the reflecting surface 37 of a mirror 38. The scratch or slit 36 permits the passage of light through the mirror 38, and such light passing through the slit 36 falls on the photosensitive surface of a photomultiplier represented by the block 39. Thus, the light reflected at the surface 12 follows the path indicated by the lines 40 and falls on the photosensitive surface of the photomultiplier 39 causing the photomultiplier 39 to generate an electrical signal or voltage which may be amplified by the amplifier 41. The preferred orientation of the slit 36 depends upon the relative positions of the projector 22, the photomultiplier 39 and the inclination of the surface 12, and for maximum sensitivity the image of the slit 27 on the surface 12 should be co-incident with the slit 36. In cases where the plane of the surface 12 is unavoidably inclined at an angle with respect to the image of the slit 27 thereon it is desirable to use a relatively short slit 36 or a relatively short slit 27 or both.

The mirror 38 with a scratch or slit 36 thereon has the advantage that it serves not only as a means for restricting the light falling on the photomultiplier 39 to the light which follows the path 40 but also aids in initially setting up the apparatus. The mirror 38 is disposed transversely to the path 40, and may, for example, be disposed at an angle of 45° with respect thereto, and the slit 36 as well as the reflecting surfaces 37 adjacent thereto may be observed through a lens 42. When the prism 31 is not rotating and when the positions of the prism 31 and the surface 12 are correct, the observer sees through the lens 42 what appears to be the surface 12, the image of the slit 27 focused on the surface 12 and a dark line which is the scratch or slit 36. When the bright image of the slit 27 coincides with the dark line corresponding to the scratch 36, the system is correctly aligned and the light reflected from the surface 12 passes through the scratch or slit 36 to the photomultiplier 39. If the bright slit image observed through the lens 42 is considerably wider than the dark line, the optical systems should be improved or adjusted or the scratch or slit 36 should be made wider.

Of course, it will be understood that other devices for forming the slit 36 either with or without a light reflecting surface, may be employed in place of the mirror 38. Furthermore, a half-silvered mirror may be employed between such other slit forming devices and the photomultiplier 39 to aid in initially setting up the apparatus as aforesaid. In addition, it will be apparent to those skilled in the art that the lens system 42 and the photomultiplier 39 may be interchanged in position, the lens system 42 may be omitted, or the lens system 42 may be substituted for the photomultiplier 39 during the initial adjustment of the apparatus and then replaced by the photomultiplier 39.

If it is desired to increase the amount of light falling on the surface 12 and falling on the photosensitive surface of the photomultiplier 39, the mask 26 may be provided with a plurality of slits extending parallel to the slit 27 and spaced from each other, and the reflecting surface 37 of the mirror 38 may be provided with a plurality of spaced slits or scratches extending parallel to the slit or scratch 36, the spacing between the scratches on the mirror 38 being such that the images of the slits in the mask 26 fall on the scratches on the mirror 38. In this modification the images of each of the slits of the mask 26 preferably should be focused substantially on the surface 12. However, in order to avoid ambiguity in measurement, a plurality of slits in the mask 26 and in the reflecting surface of the mirror 38 should be employed only when there are relatively small variations in the location of the surface 12. Ambiguous indications of measurement may be minimized by using lenses or lens systems having a small depth of field.

When the prism 31 is rotated, for example, clockwise as indicated by the arrow 43, the beam 32 will be deflected between two positions such as the two positions represented by the dotted lines 44 and 45, and when the beam 32 passes through the position shown in solid lines in FIG. 2, the illuminating and viewing directions intersecting at such positions, a voltage pulse will be produced at the output of the amplifier 41, which pulse may be observed on the oscilloscope 46. The oscilloscope 46 may be a conventional type of oscilloscope having a cathode ray tube 47 whose vertical deflection plates are connected to the output of the amplifier 41. The horizontal sweep circuits of the oscilloscope 46 may be synchronized by means of synchronizing voltages supplied by way of a lead 48 so that the trace 49 on the cathode ray tube 47 commences substantially at the time that the beam 32 is in the position indicated by the dotted lines 44. Such synchronizing voltages may be supplied in any well known manner and may, for example, be obtained from the voltage source 34 or if the motor 33 is powered from the same source as the oscilloscope 46, the synchronizing voltage may be generated in conventional circuits within the oscilloscope 46. The portion 50 of the trace 49 is representative of the shape of the voltage pulse at the output of the amplifier 41 when the beam 32 passes through the position shown in solid lines, FIG. 2. When the beam 32 is in other positions, substantially no signals or pulses, other than those produced by electrical "noise" or rapid variations of relatively strong stray light, or patterns of stray light, falling on the detecting optical system or upon the object surface 12 will be present at the output of the amplifier 41.

Alternatively, the synchronizing voltage pulses may be obtained by providing a peripherally extending band of reflecting material, such as silver, at one end of the prism 31, which band will periodically reflect a portion of the light passing through the slit 30 along the path indicated by the dotted line 32a in FIG. 2. Such reflected portion of the light may be directed through suitable masking means on the light sensitive surface of the photomultiplier 39 to cause the synchronizing voltage pulse to be generated in the photomultiplier 39 in a well-known manner, or it may be intercepted by the light sensitive surface of a photo-cell 39a whose output voltage pulse may be supplied to the oscilloscope 46 by way of the lead 48. Alternatively, a beam splitter 150 may be positioned as shown in FIG. 2 and the light reflected by the prism 31 may be directed by the beam splitter 150 through the slit 36. Proper phasing of the synchronizing pulses may be obtained in an obvious manner by adjusting the relative positions of the components used to generate the synchronizing pulses.

It will be apparent to those skilled in the art from the foregoing description of the embodiment of FIG. 2 and from an examination of FIG. 2A, which shows typical traces obtained on the oscilloscope 46 shown in FIG. 2, that the position of the peak of the pulse trace 50 with respect to the beginning 49a of the trace 49, i.e. the distance "a" (FIG. 2A), is a measure of the height of the surface 12 above the upper surface 14 of the positioner 15. Furthermore, as the height of the surface 12 above the surface 14 varies, the position of the peak of the pulse trace 50 with respect to the beginning 49a of the trace 49 will vary, the peak of the pulse trace 50 being nearer the beginning 49a when the surface 12 is nearer the surface 14 and vice versa. By suitable calibration of the apparatus and the trace 49 in an obvious manner, the height of the surface 12 above the surface 14 may be read directly from a scale on the face of the cathode ray tube 47.

It has been found that the embodiment of FIG. 2 will also provide an indication of the roughness of the surface 12. In a practical case, the illuminating beam 32 and the viewing beam or path 40 are made as narrow as possible compatible with light efficiency, and if the surface 12 is relatively smooth, the pulse trace appearing on the oscilloscope 46 will have a shape similar to that of the pulse trace 50 shown in the upper portion of FIG. 2A. On the other hand, if the surface 12 is relatively rough, the shape of the pulse trace will vary in width and in other ways, and may, for example, have the shape of the pulse trace 50a shown in the lower portion of FIG. 2A. By determining the pulse trace shapes obtained with surfaces having known degrees of roughness, the apparatus of FIG. 2 may be calibrated so as to provide a measure of the roughness of other surfaces measured by the apparatus of FIG. 2.

The height of the surface 12 above the surface 14 may also be indicated by a phase meter 55 connected to the output of the amplifier 41 and connected to a known type of comparison voltage source 56 which may, for example, be synchronized with the voltage source 34 and generate reference voltage pulses for comparison with the voltage pulses at the output of the amplifier 41. Such comparison voltage source 56 may be any well known type of synchronized pulse generator such as a monostable multivibrator, and when a phase meter 55 is employed for measurement indication purposes, the amplifier 41 preferably includes amplitude limiting circuits so that the measurement will be unaffected by the absolute magnitude of the signal generated by the photomultiplier 39. The indicating needle of the phase meter 55 will be deflected an amount dependent upon the time spacing between the comparison voltage pulse and the pulse produced at the output of the amplifier 41, and therefore, the reading of the phase meter 55 will indicate the spacing of the surface 12 above the surface 14 and hence, will indicate the thickness of the object or material 13.

If it is desired to increase the ease with which the output signal of the photomultiplier 39 may be amplified by the amplifier 41, an opaque chopper disc 51 having a plurality of opaque arms 52 may be positioned as shown in FIG. 2 to interrupt the beam 32 or may be located elsewhere in either the illuminating or viewing beams. The chopper disc 51 may be driven by a motor 53. However, due to the form of the output signal of the photomultiplier 39, the chopper disc 51 may be omitted, and the output signal of the photomultiplier 39 may be amplified by known types of amplifier circuits.

Although in the preferred embodiment of the invention, the light beam 32 is deflected across the surface 12, the beam 32 may be maintained stationary, the prism 31 being omitted, and the path of the light reflected from the surface 12 may be deflected such as by a rotatable prism 54 illustrated by dotted lines in FIG. 2. This modification of the invention is not as satisfactory as the preferred embodiment because of the effects of stray or ambient light.

FIG. 3 illustrates a modification of the embodiment shown in FIG. 2 and employs a single lens 57 for both the incident or illuminating light beam 58 and the reflected light 59. The central portion of the lens 57 is masked by an opaque stop 60 and the incident and reflected light are separated by an opaque shield 61. The angle of incidence of the light from the source 62 is varied by the light direction control means 62a, which may include prism, such as the prism 31, a rotating or oscillating mirror, etc., and passes through a portion of the lens 57, the beam 58 being deflected across the surface 12 in the manner described above. The reflected light 59 passes through a portion of the lens 57, is focused by a lens or lens system 63 on a slit 64 in a diaphragm or mask 65, passes through the slit 64 and falls on the photosensitive surface of the photomultiplier 39. The photomultiplier 39 may be connected to an amplifier and to indicating apparatus in the manner shown in FIG. 2, and the operation of the embodiment shown in FIG. 3 is similar to the operation of the embodiment shown in FIG. 2. If desired, the lens 63 may be omitted.

In the embodiments shown in FIGS. 2 and 3, the illuminating beam and the viewing beam may be maintained stationary and the positioning device or positioner 15 may be moved to obtain a measurement of the height of the surface 12 above the surface 14. FIG. 4 illustrates one form of movable positioner 15 which may be employed for this purpose. In FIG. 4 the shaft 66 of the positioner 15 is slidably mounted in a fixed bearing 67 and carries a roller 68 which engages a cam 69. The shaft 66 of the positioner 15 is urged downwardly by a spring 70 which bears at one end against the bearing 67 and at the other end against a collar 72 secured to the shaft 66. The cam 69 is rotated by a synchronous motor 73 so that the positioner 15 is moved up and down between fixed predetermined positions. As the positioner 15 is moved from its lowermost position toward its uppermost position a voltage pulse will be produced at the output of the amplifier 41 at a position of the positioner 15 dependent upon the distance of the surface 12 above the surface 14. Accordingly, if the oscilloscope 46 or the comparison voltage source 56 are synchronized with the movement of the positioner 15, the oscilloscope 46 and the phase meter 55 will indicate the amount of travel of the positioner 15 from its lowermost position to the time that the voltage pulse is obtained at the output of the amplifier 41 and hence, the oscilloscope 46 and the phase meter 55 will indicate the height of the surface 12 above the height of the surface 14. For example, if the material or object 13 is removed from the positioner 15 and the positioner 15 moves ten one-thousandths of an inch from its lowermost position before the peak of the output voltage pulse of the amplifier 41 is reached, then the positioner 15 will move only five one-thousandths of an inch from its lowermost position if a material or object 13 five one-thousandths of an inch thick is placed on the upper surface 14 of the positioner 15. Thus, the thickness of the object 13 is the difference between the two amounts of travel of the positioner 15, that is, without the object 13 thereon and with the object 13 thereon, and in the example given, is five one-thousandths of an inch.

In the preferred embodiments of the invention, the illuminating beam, the viewing beam or the positioner is moved periodically and at a relatively rapid rate, for example, two hundred and forty times per second, and the movement may be substantially linear. However, it will be understood that the movement may be non-periodic and may be non-linear.

In the modified embodiment of the invention illustrated in FIG. 5, an electromagnetic radiant energy source 74, such as the projector 22 shown in FIG. 2, directs energy along the lines 75 through a transparent focusing means, such as a semi-cylindrical lens, and through a slit 77 in a mask or diaphragm 78. The lens 76 focuses the energy along a line 79 which intersects the object 13. By means of a spirally perforated, opaque rotatable shutter 80, shown in greater detail in FIG. 6, only a narrow beam of energy 81 is permitted to fall on the surface 12 at any given time. As shown in FIG. 6, the shutter 80 has a spirally shaped perforation 82 thereunder, and where the perforation 82 and the slit 77 in the mask 78 overlap or are in alignment, such as at 83 in the position of the shutter 80 shown, the energy from the source 74 is permitted to pass to the surface 12. Accordingly, as the shutter 80 is rotated by a motor 84, the beam of energy 81 is deflected transversely thereof as shown in FIG. 5.

The viewing beam of the energy detector 85 is indicated by the lines 86, a lens 87 being employed, if the energy is light energy, to focus the light reflected from the surface 12 on a slit in the mask 88 in the manner described above. The maximum amount of energy will be received by the detector 85 when the beam 81 and the surface 12 are in the positions shown in FIG. 5, and the maximum amount of energy will be received by the detector 85 when the beam 81 is in different positions if the height of the surface 12 above the positioner 15 is different from that shown in FIG. 5. Accordingly, the operation of the embodiment shown in FIG. 5 is similar to the operation of the embodiment illustrated in FIG. 2, the position of the beam 81 when maximum energy is received by the detector 85 providing an indication of the height of the surface 12 above the positioner 15. The indicating apparatus may be the same as that illustrated in FIG. 2 and is synchronized with the movement of the beam 81 as described above.

If desired, a converging lens or lens system 76a may be placed between the shutter 80 and the surface 12 to focus an image of the aperture 83 on the surface 12. In this modification, the lens 76 could be omitted and the slit 77 would be uniformly illuminated by the source 74.

In the preceding embodiments, the illuminating beam which scans the surface 12 is deflected transversely to the direction of the light beam. FIG. 7 illustrates an embodiment of the invention in which the direction of the light beam remains fixed but the focal point of the lens system is varied longitudinally of the path of the light beam. The apparatus of FIG. 7 is useful primarily in measuring a relatively small range of changes in the height of the surface 12 above the positioner 15 or for indicating that the height of the surface 12 above the positioner 15 has varied materially from a desired value. In the latter case, if the height of the surface 12 above the positioner 15 varies materially from the height shown in FIG. 7, that is, from the height at which the focal point of the lens 89 intersects the focal points of the lens 87 at the surface 12, substantially no or a very small amount of light will be received by the detector 85. However, within a narrow range of variation of the height of the surface 12, the position of the focal point of the lens 89 at which maximum energy is received by the detector 85 is an indication of the height of the surface 12.

In the apparatus of FIG. 7 an image of the light or energy source may be focused on the upper surface 12 of the object 13 by means of the lens 89. The lens 89 is mounted in a hollow cylinder 90 to move therewith. The cylinder 90 is surrounded by a coil 91, the ends of which may be connected to a deflecting voltage source at the terminals 92 and 93. Such deflecting voltage source may, for example, be the alternating current power source or any other known type of periodic or non-periodic voltage source. The cylinder 90 is mounted on a flexible diaphragm 94 which is fixedly secured at its periphery. The coil 91 is within the magnetic field of a pair of magnets 95 and 96 so that when the coil 91 is energized, the cylinder 90 and hence the lens 89 will be moved longitudinally of the path of the light beam 97 and will cause the focal point to vary as indicated by the dotted lines 98 and 99. The position of the focal point at which the maximum energy is received by the detector 85 is dependent upon the height of the surface 12 of the positioner 15 and therefore, the position of the focal point is a measure of the height of the surface 12. Indicating apparatus of the type described above may be employed to indicate the position of the focal point at the time the maximum energy is received by the detector 85 and hence to indicate the height of the surface 12.

The block diagram of FIG. 8 illustrates other forms of indicating apparatus which may be employed in connection with any of the embodiments described above, the blocks in FIG. 8 representing individually well-known electrical circuits. The positioner or scanner voltage source 100, which may, for example, be an alternating current source, provides the energy required to move the positioner, such as the positioner 15, or the illuminating beam scanner, such as the prism 31, such positioner or scanner being represented by the block 101 which is electrically connected as shown in FIG. 8 to the source 100. The source 100 is connected also to a shaping circuit 102 which produces pulses 103 shown in FIG. 9 at predetermined positions of the positioning or scanning device, for example, when the positioner 15 is in its lowermost position or when the light beam is in the position indicated by the dotted lines 44 in FIG. 2. Such pulses 103 control a bistable multivibrator 104 and cause it to assume a state in which the wave form 105 is initiated when the pulses 103 are applied thereto.

The multivibrator 104 is controlled also by the output pulses 106 of the energy detector 85, or if the apparatus of FIGS. 2 or 3 is employed, the photomultiplier 39 and amplifier 41. The pulses 106 are shaped in a shaper 107 into pulses 108 shown in FIG. 9 and such pulses 108 return the multivibrator 104 to its initial state, thereby terminating the voltage wave form 105. Since the duration of the wave form 105 is dependent upon the time spacing of the energy pulses 106 with respect to the pulses 103, the duration of the wave forms 105 is dependent upon the height of the surface 12 above the upper surface 14 of the positioner 15. By means of a rectifier and filter circuit 109 the output voltage of the multivibrator 104 may be rectified and filtered to provide at the output of the rectifier and filter 109 a voltage whose average value is dependent upon the height of the surface 12. Accordingly, by means of an average voltmeter 110 the height of the surface 12 may be indicated.

The output of the multivibrator 104 may also be connected to the charging circuit of a sawtooth generator 111 to cause the charging circuit voltage to rise at the time that the voltage wave form 105 is initiated, the charging circuit voltage being indicated at 112 in FIG. 9. The generator 111 is connected also to the output of the shaper 107 so that the pulses 108 cause the charging circuit to discharge, and therefore, the peak voltage reached by the charging circuit is dependent upon the height of the surface 12. The charging voltage 112 may be observed on an oscilloscope 113 connected to the generator 111, and hence, the peak of the voltage 112 may be observed and measured on the oscilloscope 113. Alternatively, or in addition, the peak of the voltage 112 may be measured by a peak voltmeter 114 connected to the output of the generator 111.

FIG. 10 is a block diagram of individually well-known electrical circuits which may be employed to control automatically the position or thickness of the material or object 13 being measured by the apparatus of the invention. For example, if the material 13 is being rolled, the control apparatus which controls the separation of the rolls, represented by the block 115 in FIG. 10 may be operated by the apparatus of the invention to maintain the material 13 at a predetermined thickness. FIG. 10 should be considered in conjunction with FIG. 11 which shows the voltage wave forms of circuits illustrated by blocks in FIG. 10.

In FIG. 10 the positioner or scanner voltage source 100 is connected to a shaper 102 to provide synchronizing pulses 103 illustrated in FIG. 11. The output of the shaper 102 is connected to a mono-stable multivibrator 116 which produces output pulses 117 which are supplied to a gate circuit 118. The energy pulses at the output of the energy detector 85 are supplied to a shaper 119 which supplies pulses 120 corresponding in time position to the energy pulses supplied by the detector 85. The inputs of the gates 118 and 121 are connected to the output of the shaper 119 and when the gates 118 and 121 are "on" they permit the output pulses of the shaper 119 to pass to the position of thickness control apparatus 115. Similarly when the gates 118 and 121 are "off" the output pulses of the shaper 119 are prevented from passing to the input of the control apparatus 115.

The duration of the output pulses 117 of the multivibrator 116 are selected so that the gate 118 is "on" for a period of time corresponding to thicknesses of the material 13 less than the desired thickness. Accordingly, if the energy detector 85 supplies energy pulses to the shaper 119 which indicate that the height of the surface 12 is less than the desired height, the shaper 119 will supply pulses to the gate 118 corresponding to the pulses 122 shown in dotted lines in FIG. 11. Since at times corresponding to the positions of the pulses 122 the gate 118 is "on" such pulses 122 will be supplied to the control apparatus 115 and will cause the apparatus which determines the thickness of the material 13, such as the rolls of a rolling mill, to move farther apart and increase the thickness of the material 13.

The multivibrator 116 is connected also to a delay and shaper circuit 123 which produces pulses 124 at the output thereof which are delayed by a predetermined selected amount from the time of termination of the pulses 117. The time delay between the beginning of the pulses 124 and the termination of the pulses 117 is determined by the desired tolerances for the thickness of the material 13. The output of the delay and shaper circuit 123 is connected to a second mono-stable multivibrator 125 which generates pulses 126 which are supplied to the gate 121. The time of initiation of the pulses 126 is controlled by the pulses 124 and the duration of the pulses 126 is selected so that the pulses 126 terminate substantially when the pulses 117 are initiated. It will be apparent from an examination of the wave forms shown in FIG. 11 that the gate 118 is "on" when the gate 121 is "off" and vice versa. However, there is a short period of time identified by the word "tolerance" in FIG. 11 when both the gate 118 and the gate 121 are "off."

If the pulses supplied by the shaper 119 occur at times corresponding to thicknesses of the material 13 greater than the desired thickness, such as the pulses 127 shown in FIG. 11, the gate 121 is "on" and such pulses will pass to the control apparatus 115 and will cause it to operate the apparatus which determines the thickness of the material 13 in a direction which reduces the thickness of the material 13. However, if the output pulses of the shaper 119 occur at times within the time period identified with the word "tolerance" in FIG. 11, such as the pulses 120, both gate 118 and gate 121 will be "off" so that no pulses are supplied to the control apparatus 115, indicating that the material 13 is of the correct thickness.

Accordingly, if the thickness of the material 13 is within the desired tolerances as determined by the apparatus indicated in FIG. 10, the control apparatus 115 will not be operated. On the other hand, if the thickness of the material 13 is outside of the desired tolerances, the thickness control apparatus 115 will be operated in a direction to correct the thickness of the material 13.

FIG. 12 illustrates in block form individually well-known circuits which may be employed with any of the preceding embodiments to operate alarm or control apparatus such as apparatus for controlling the sorting of materials of different sizes. FIG. 12 should be considered in conjunction with FIG. 13 which shows wave forms of the voltages developed in electrical circuits illustrated by blocks in FIG. 12. In FIG. 12 the positioner or scanner voltage source 100 is connected to the shaper 102 which provides output pulses 103 shown in FIG. 13. The output of the shaper 102 is connected to a delay circuit 128 which in turn is connected to a mono-stable multivibrator 129. The output voltage of the multivibrator 129 has the wave form indicated at 130 in FIG. 13 and the portion 131 thereof is initiated by the pulses 103 after they have been delayed by the delay circuit 128. The multivibrator 129 is connected to a gate circuit 132 similar to the gate circuits 118 and 121 previously described and the gate circuit 132 is connected also to the energy detector 85. The gate 132 is normally maintained "on" by the output voltage of the multivibrator 129 but during the portion 131 of the output voltage of the multivibrator 129 the gate 132 is turned "off." Pulses supplied by the detector 85 when the gate 132 is "on" are passed to the alarm or control apparatus 133. Conversely when the gate 132 is "off" pulses at the output of the detector 85 are prevented from reaching the alarm or control apparatus 133.

Referring to FIG. 13 if it is assumed that pulses, such as the pulses 134, occurring during the interval that the gate 132 is "off," correspond to the correct thickness of the material 13, then the alarm or control apparatus 133 will not be energized by the output pulses of the detector 85 when the material 13 is of the correct thickness. On the other hand, if the detector 85 supplies pulses, such as the pulses 135, indicating the material 13 is thinner than desired, or if the detector 85 supplies pulses, such as the pulses 136, indicating that the material 13 is thicker than desired, the alarm or control apparatus 133 will be energized, causing operation of the alarm or operation of the control apparatus. The alarm 133 may be a conventional visible or audible alarm and the control apparatus may be conventional motion controlling apparatus or conventional deflecting apparatus which deflects undesired material or objects from the path followed by desired material or objects.

Having thus described my invention with particular reference to the preferred form thereof and having shown and described certain modifications, it will be obvious to those skilled in the art to which the invention pertains, after understanding my invention, that various changes and other modifications may be made therein without departing from the spirit and scope of my invention, as defined by the claims appended thereto.

What is claimed is:

1. Apparatus for measuring the position of a surface of an object comprising means for illuminating said surface with a relatively narrow illuminating beam of electromagnetic radiant energy, directional detecting means electrically responsive to said energy and having a relatively narrow viewing beam, said detecting means being positioned to receive at least a portion of said energy reflected from said surface with said surface in a predetermined position, means for producing relative movement, independent of the energy received by said detecting means, between at least one of said illuminating and said viewing beams and said surface and indicating means synchronized with said means for producing relative movement and connected to and operable by said detecting means for indicating the relative positions of said one of said beams and said surface when said illuminating beam and said viewing beam intersect at said surface.

2. Apparatus for measuring the position of a surface of an object comprising means for illuminating said surface with a relatively narrow illuminating beam of electromagnetic radiant energy, directional detecting means spaced from said illuminating means, electrically responsive to said energy and having a relatively narrow viewing beam, said detecting means being positioned to receive at least a portion of said energy reflected from said surface with said surface in a predetermined position, means for producing relative movement, independent of the energy received by said detecting means, between said illuminating and said viewing beams and said surface and indicating means synchronized with said means for producing relative movement and connected to and operable by said detecting means for indicating the relative positions of said beams and said surface when said illuminating beam and said viewing beam intersect at said surface.

3. Apparatus for measuring the position of a surface of an object comprising means for illuminating said surface with a relatively narrow illuminating beam of electromagnetic radiant energy, directional detecting means spaced from said illuminating means, electrically responsive to said energy and having a relatively narrow viewing beam, said detecting means being positioned to receive at least a portion of said energy reflected from said surface with said surface in a predetermined position, means for producing relative movement between said illuminating beam and said surface and indicating means synchronized with said means for producing relative movement and connected to and operable by said detecting means for indicating the relative positions of said illuminating beam and said surface when said illuminating beam and said viewing beam intersect at said surface.

4. Apparatus for measuring the position of a surface of an object comprising means for illuminating said surface with a relatively narrow illuminating beam of electromagnetic radiant energy, directional detecting means spaced from said illuminating means, electrically responsive to said energy and having a relatively narrow viewing beam, said detecting means being positioned to receive at least a portion of said energy reflected from said surface with said surface in a predetermined position, means for producing relative movement, independent of the energy received by said detecting means, between said viewing beam and said surface and indicating means synchronized with said means for producing relative movement and connected to and operable by said detecting means for indicating the relative position of said viewing beam and said surface when said illuminating beam and said viewing beam intersect at said surface.

5. Apparatus for measuring the position of a surface of an object comprising means for illuminating said surface with a relatively narrow illuminating beam of electromagnetic radiant energy, directional detecting means spaced from said illuminating means, electrically responsive to energy and having a relatively narrow viewing beam, said detecting means being positioned to receive at least a portion of said energy reflected from said surface with said surface in a predetermined position, means for moving said object and said surface and indicating means synchronized with said moving means and connected to and operable by said detecting means for indicating the position of said surface when said illuminating beam and said viewing beam intersect at said surface.

6. Apparatus for measuring the distance of a surface of an object from a predetermined reference position comprising means for directing a narrow, illuminating beam of electromagnetic radiant energy on said surface, means electrically responsive to said energy and having a narrow viewing beam, said electrically responsive means being positioned to receive at least a portion of said energy reflected from said surface with said surface in a predetermined position, means for moving one of said beams between a reference position and a second position different from said reference position and independent of the energy received by said electrically responsive means, and means synchronized with said moving means and electrically connected and responsive to said electrically responsive means for indicating the position of said one beam at which energy having a predetermined characteristic is received by said energy responsive means.

7. Apparatus for measuring the distance of a surface of an object from a predetermined reference position comprising means for directing a narrow, illuminating beam of electromagnetic radiant energy on said surface, means electrically responsive to said energy and having a narrow viewing beam, said electrically responsive means being positioned to receive at least a portion of said energy reflected from said surface with said surface in a predetermined position, means for moving said illuminating beam between a reference position and a second position different from said reference position, and means synchronized with said moving means and electrically connected and responsive to said electrically responsive means for indicating the position of said illuminating beam at which a predetermined amount of energy is received by said energy responsive means.

8. Apparatus for measuring the distance of a surface of an object from a predetermined reference position comprising means for directing a narrow, illuminating beam of electromagnetic radiant energy on said surface, means electrically responsive to said energy and having a narrow viewing beam, said electrically responsive means being positioned to receive at least a portion of said energy reflected from said surface with said surface in a predetermined position, means for moving said viewing beam between a reference position and a second position different from said reference position and independent of the energy received by said electrically responsive means, and means synchronized with said moving means and electrically connected and responsive to said electrically responsive means for indicating the position of said viewing beam at which a predetermined amount of energy is received by said energy responsive means.

9. Apparatus for measuring the distance of a surface of an object from a predetermined reference position comprising means for directing a narrow, illuminating beam of electromagnetic radiant energy on said surface, means electrically responsive to said energy and having a narrow viewing beam, said electrically responsive means being positioned to receive at least a portion of said energy reflected from said surface with said surface in a predetermined position, means for moving said object between a reference position and a second position different from said reference position, and means synchronized with said moving means and electrically connected and responsive to said electrically responsive means for indicating the position of said object at which energy having a predetermined characteristic is received by said energy responsive means.

10. Apparatus for measuring the distance of a surface of an object from a predetermined reference position comprising means for producing a relatively narrow beam of light directed at an angle with respect to said surface, means for deflecting said beam across said surface along a predetermined path comprising a rotable transparent prism mounted to intercept said beam and means for rotating said prism at a predetermined rate, a light detector electrically responsive to the light of said beam falling thereon, an opaque mask having a light transmitting slit therethrough and mounted between said surface and said detector, the light passing through said slit falling on said detector, lens means mounted between said mask and said surface and adapted to focus the light of said beam reflected from said surface at an angle to said beam and to said surface on said slit at predetermined relative positions of said beam and said surface, the beam position being different for each different position of said surface, and means synchronized with said means for rotating said prism and connected to the output of said detector for indicating the position of said beam at which a predetermined amount of said light falls on said detector.

11. Apparatus for measuring the distance of a surface of an object from a predetermined reference position comprising means for producing a relatively narrow beam of light directed at an angle with respect to said surface, means for deflecting said beam across said surface along a predetermined path comprising a rotatable transparent prism mounted to intercept said beam and means for rotating said prism at a predetermined rate, a light detector electrically responsive to the light of said beam falling thereon, an opaque mask having a light transmitting slit therethrough and mounted between said surface and said detector, the light passing through said slit falling on said detector, lens means mounted between said mask and said surface and adapted to focus the light of said beam reflected from said surface at an angle to said beam and to said surface on said slit at predetermined relative positions of said beam and said surface, the beam position being different for each different position of said surface, an oscilloscope having means for displaying a trace and deflecting means therefor, means for synchronizing said trace with said means for rotating said prism, and means connecting the output of said detector to said deflecting means, whereby the output signal of said detecting means is displayed on said trace at a position dependent upon the distance of said surface from said reference position.

12. Apparatus for measuring the distance of a surface of an object from a predetermined reference position comprising means for producing a relatively narrow beam of light directed at an angle with respect to said surface, a light detector electrically responsive to the light of said beam falling thereon, an opaque mask having a light transmitting slit therethrough and mounted between said surface and said detector, the light passing through said slit falling on said detector, leans means having a viewing direction, mounted between said mask and said surface and adapted to focus the light of said beam reflected from said surface at an angle thereto on said slit, means for moving the viewing direction of said lens means across said surface along a predetermined path intersecting the past of said beam comprising a rotatable transparent prism mounted between said surface and said lens means and means for rotating said prism at a predetermined rate, and means synchronized with said means for rotating said prism and connected to the output of said detector for indicating the position of said beam at which a predetermined amount of said light falls on said detector.

13. Apparatus for measuring the distance of a surface of an object from a predetermined reference position comprising means for producing a relatively narrow beam of light directed at an angle with respect to said surface, a light detector electrically responsive to the light of said beam falling thereon, an opaque mask having a light transmitting slit therethrough and mounted between said surface and said detector, the light passing through said slit falling on said detector, lens means having a viewing direction, mounted between said mask and said surface and adapted to focus the light of said beam reflected from said surface at an angle to said beam and to said surface on said slit with said surface in a predetermined position, positioning means for positioning said object, means for moving said positioning means at a predetermned rate along a predetermined path and between predetermined positions, and means synchronized with said means for moving said positioning means and connected to the output of said detector for indicating the position of said positioning means at which a predetermined amount of said light falls on said detector.

14. Apparatus for measuring the distance of a surface of an object from a predetermined reference position comprising a converging lens, an opaque mask covering the central portion of said lens, means for producing a beam of light and for directing said beam through one portion of said lens adjacent said mask and on said surface, means for deflecting said beam mounted in the path thereof, an opaque mask with a light transmitting slit therethrough, said mask being mounted with said slit in the path of light of said beam reflected from said surface and which passes through another portion of said lens adjacent said first-mentioned mask, light detecting means mounted to receive light passing through said slit, and means synchronized with said deflecting means and connected to the output of said detecting means for indicating the position of said beam at which light reflected from said surface is received by said detecting means.

15. Apparatus for measuring the distance of a surface of an object from a predetermined reference position comprising means for producing a beam of electromagnetic radiant energy directed toward said surface at an angle with respect thereto, a first opaque mask having a light transmitting slit therethrough, said mask being mounted with said slit in the path of said beam, a rotatable shutter having a radially extending, energy transmitting slit therethrough and mounted with a portion of said last-mentioned slit in alignment with a portion of said slit in said mask for permitting a relatively narrow portion of said beam to pass through both said slits, means for rotating said shutter at a predetermined rate for causing said portion of said beam to scan said surface along a predetermined path, a second opaque mask having an energy transmitting slit therethrough and mounted in the path of the energy reflected by said surface at an angle to said beam and to said surface in predetermined positions of said beam and said surface, means for detecting said energy mounted to receive said energy passing through said slit of said second mask, and means synchronized with said shutter rotating means and connected to the output of said detecting means for indicating the position of said beam at which said energy reflected from said surface is received by said detecting means.

16. Apparatus for measuring the distance of a surface of an object from a predetermined reference position comprising a source of electromagnetic radiant energy, first lens means for focusing energy from said source on said surface, said lens means comprising a lens mounted for movement toward and away from said source and means for moving said lens toward and away from said source at a predetermined rate, an opaque mask having an energy transmitting slit therethrough, second lens means for focusing energy of said source reflected by said surface at an angle thereto on said slit, energy detecting means mounted to receive energy passing through said slit and means synchronized with said lens moving means and connected to the output of said detecting means for indicating the position of said lens at which a predetermined amount of said energy reflected from said surface is received by said detecting means.

17. Apparatus for measuring the distance of a surface of an object from a reference position comprising means for illuminating said surface with a relatively narrow illuminating beam of electromagnetic radiant energy, directional detecting means electrically responsive to said energy and having a relatively narrow viewing beam, said detecting means being positioned to receive at least a portion of said energy reflected from said surface with said surface in a predetermined position, means for producing relative movement between at least one of said illuminating and said viewing beams and said surface, and means controlled by said means for producing relative movement and by said detecting means for generating a voltage having a value dependent upon the time interval between the time when said one beam is in a predetermined position with respect to said reference position and the time when the output of said detecting means has a predetermined value, and means connected to said generating means for indicating the value of said voltage.

18. Apparatus for measuring and controlling the thickness of an object, means for illuminating a surface of said object with a relatively narrow illuminating beam of electromagnetic radiant energy, directional detecting means electrically responsive to said energy and having a relatively narrow viewing beam, said detecting means being positioned to receive at least a portion of said energy reflected from said surface with said surface in a predetermined position, means for producing relative movement between at least one of said illuminating and said viewing beams and said surface, means controlled by said means for producing relative movement for generating a pair of gate voltages of predetermined time durations and separated in time with respect to each other, first gate means connected to said generating means and controlled by one of said gate voltages, said gate means also being connected to said detecting means for controlling the passage of the output signal of said detecting means through said gate means, second gate means connected to said generating means and controlled by the other of said gate voltages, said second gate means also being connected to said detecting means for controlling the passage of the output signal of said detecting means through said second gate means, and means for controlling the thickness of said object connected to both said gate means for controlling the thickness of said object in accordance with the signals passed by said gate means.

19. Apparatus for controlling the position of an object comprising means for illuminating a surface of said object with a relatively narrow illuminating beam of electromagnetic radiant energy, directional detecting means electrically responsive to said energy and having a relatively narrow viewing beam, said detecting means being positioned to receive at least a portion of said energy reflected from said surface with said surface in a predetermined position, means for producing relative movement between at least one of said illuminating and said viewing beams and said surface, means controlled by said means for producing relative movement for generating a pair of gate voltages of predetermined time durations and separated in time with respect to each other, first gate means connected to said generating means and controlled by one of said gate voltages, said gate means also being connected to said detecting means for controlling the passage of the output signal of said detecting means through said gate means, second gate means connected to said generating means and controlled by the other of said gate voltages, said second gate means also being connected to said detecting means for controlling the passage of the output signal of said detecting means through said second gate means, and means for controlling the position of said object connected to both said gate means for controlling the position of said object in accordance with the signals passed by said gate means.

20. In combination, means for illuminating a surface of an object with a relatively narrow illuminating beam of electromagnetic radiant energy, directional detecting means electrically responsive to said energy and having a relatively narrow viewing beam, said detecting means being positioned to receive at least a portion of said energy reflected from said surface with said surface in a predetermined position, means for producing relative movement between at least one of said illuminating and said viewing beams and said surface, means controlled by said means for producing relative movement for generating a gate voltage of predetermined time duration, gate means connected to said generating means and controlled by said gate voltage, said gate means also being connected to said detecting means for controlling the passage of the output signal of said detecting means through said gate means, and means connected to said gate means and operable by the signals passed by said gate means.

References Cited in the file of this patent

UNITED STATES PATENTS

| | | |
|---|---|---|
| 2,315,282 | Snow | Mar. 30, 1943 |
| 2,429,066 | Kuehni | Oct. 14, 1947 |
| 2,750,519 | Summerhayes et al. | June 12, 1956 |
| 2,773,412 | Huck | Dec. 11, 1956 |
| 2,803,161 | Summerhayes | Aug. 20, 1957 |
| 2,883,558 | Gallo | Apr. 21, 1959 |
| 2,886,717 | Williamson et al. | May 12, 1959 |

UNITED STATES PATENT OFFICE
CERTIFICATE OF CORRECTION

Patent No. 3,016,464                                    January 9, 1962

Edwin M. Bailey

It is hereby certified that error appears in the above numbered patent requiring correction and that the said Letters Patent should read as corrected below.

Column 4, line 36, for "is" read -- as --; column 6, line 47, after "image" insert -- of the image --; column 10, line 17, for "thereunder" read -- therethrough --; column 12, line 23, for "of" read -- or --; column 15, line 64, for "rotable" read -- rotatable --; column 16, lines 4 and 5, for "preetermined" read -- predetermined --; line 46, for "past" read -- path --; column 18, line 10, after "object" insert -- comprising means for positioning said object --.

Signed and sealed this 1st day of May 1962.

(SEAL)
Attest:

ERNEST W. SWIDER                                          DAVID L. LADD
Attesting Officer                                             Commissioner of Patents